United States Patent

Shimada et al.

[11] Patent Number: 6,005,734
[45] Date of Patent: Dec. 21, 1999

[54] LIBRARY UNIT FOR CALCULATING INCLINATION OF AN ACCESSOR TO CORRECT POSITIONING INFORMATION OF THE ACCESSOR

[75] Inventors: Hiroshi Shimada; Kiyotaka Tanaka; Katsufumi Ohnaka; Noriaki Matsuzaki; Takahiro Asahara, all of Kato-gun, Japan

[73] Assignee: Fujitsu Limited, Kawasaki, Japan

[21] Appl. No.: 08/774,245

[22] Filed: Dec. 27, 1996

[30] Foreign Application Priority Data

Jan. 19, 1996 [JP] Japan ..................................... 8-007736

[51] Int. Cl.$^6$ .................................................. G11B 17/22
[52] U.S. Cl. .............................................................. 360/69
[58] Field of Search .................................. 360/92, 69, 70, 360/71; 369/34, 36; 414/932, 266, 267, 277; 901/46, 47

[56] References Cited

U.S. PATENT DOCUMENTS 5,513,156  4/1996  Hanaoka et al. ...................... 369/36 X
5,581,522  12/1996  Sibuya et al. ............................... 369/36
5,703,843  12/1997  Katsuyama et al. .................. 369/36 X

FOREIGN PATENT DOCUMENTS 0 657 861  6/1995  European Pat. Off. .

*Primary Examiner*—Aristotelis M. Psitos
*Assistant Examiner*—K. Wong
*Attorney, Agent, or Firm*—Staas & Halsey LLP

[57] ABSTRACT

A library unit including a plurality of frames and a plurality of cell shelves, each of the cell shelves having a plurality of cells arranged in an X-Y plane. The plurality of cell shelves are located in at least one of the plurality of frames, at least one accessor having a picker portion, and a plurality of first reference flags, each of which having substantially the same X-axis coordinate are provided with each of the frames with a spacing in the Y-axis direction. According to the library unit, the plurality of first reference flags are detected by a sensor attached to the picker portion, and a relative inclination angle of the accessor with respect to the Y axis in the X-Y plane is calculated from a difference in position in the X-axis direction of plurality of reference flags in order to obtain a correction value in the X-axis direction for each cell.

16 Claims, 13 Drawing Sheets

PICKER OPERATION POSSIBLE

PICKER OPERATION IMPOSSIBLE

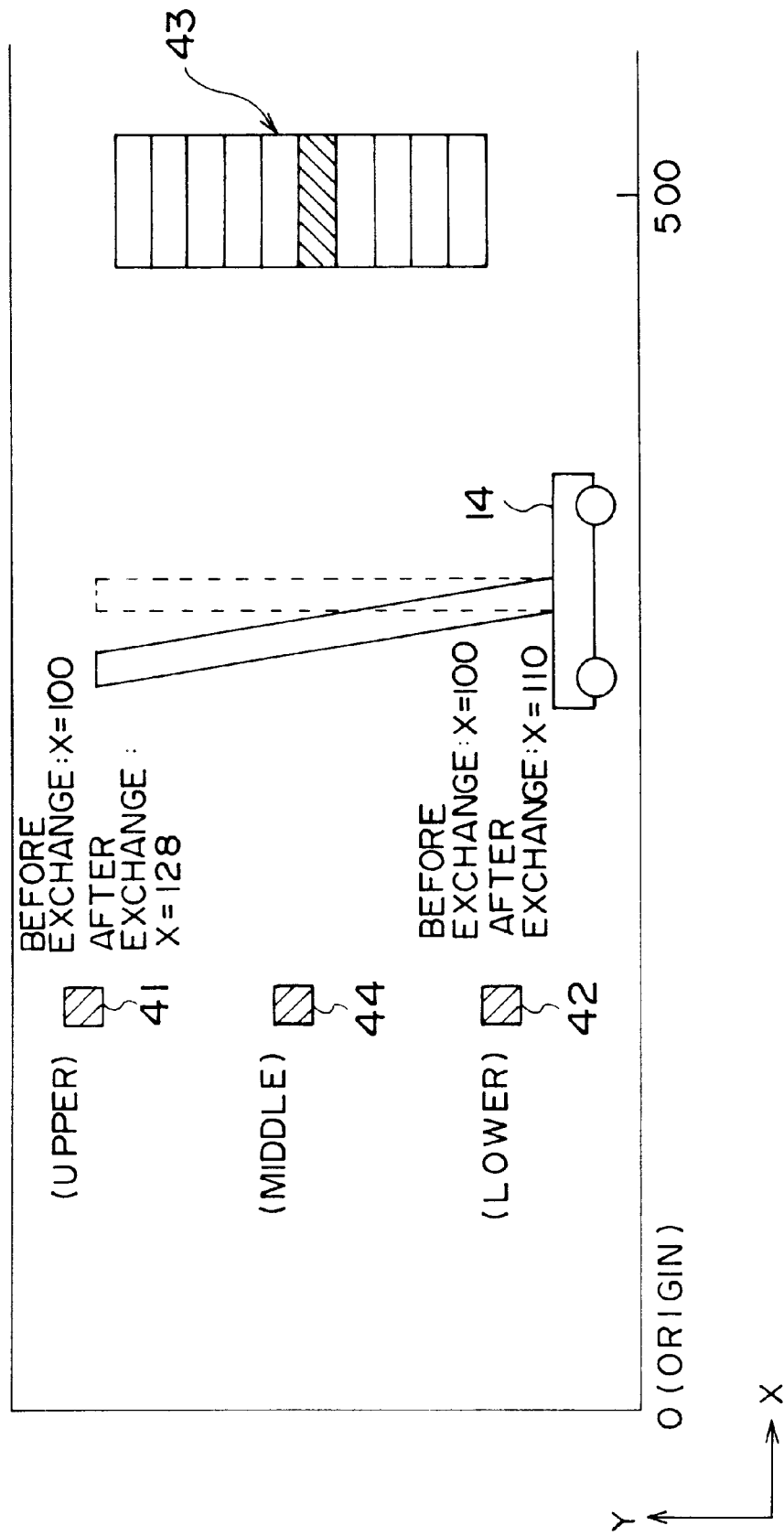

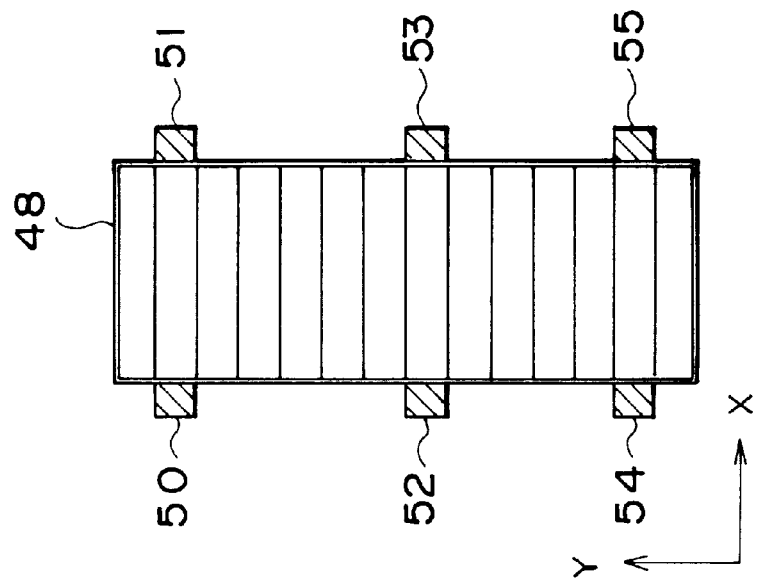
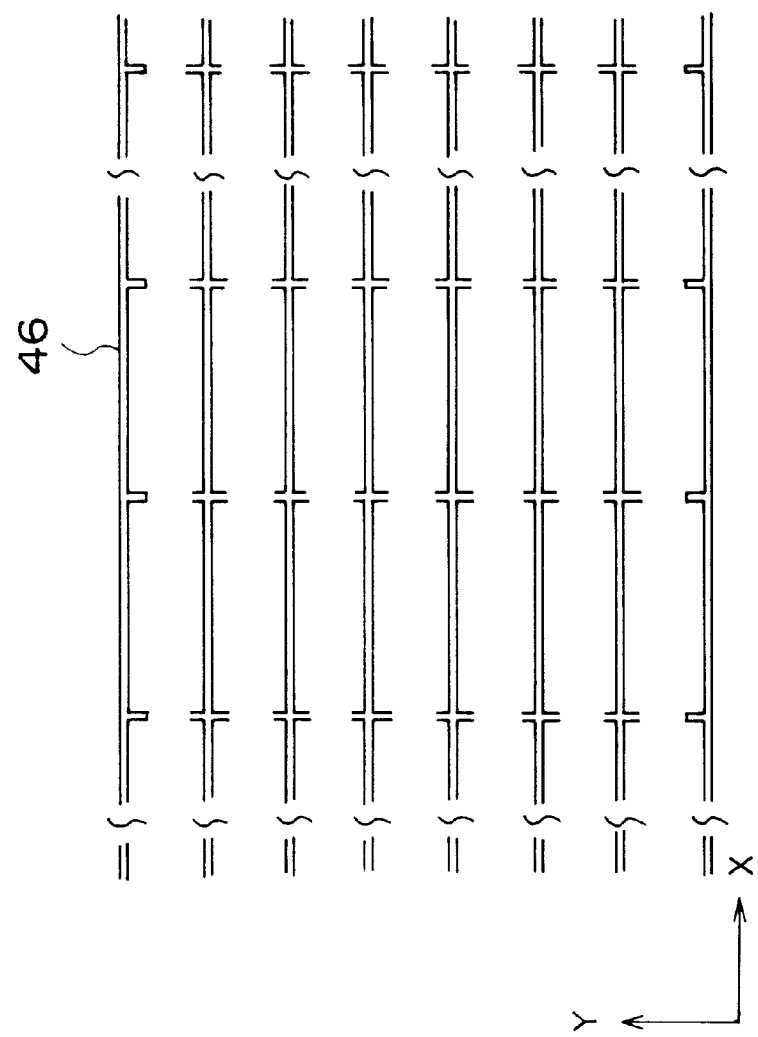

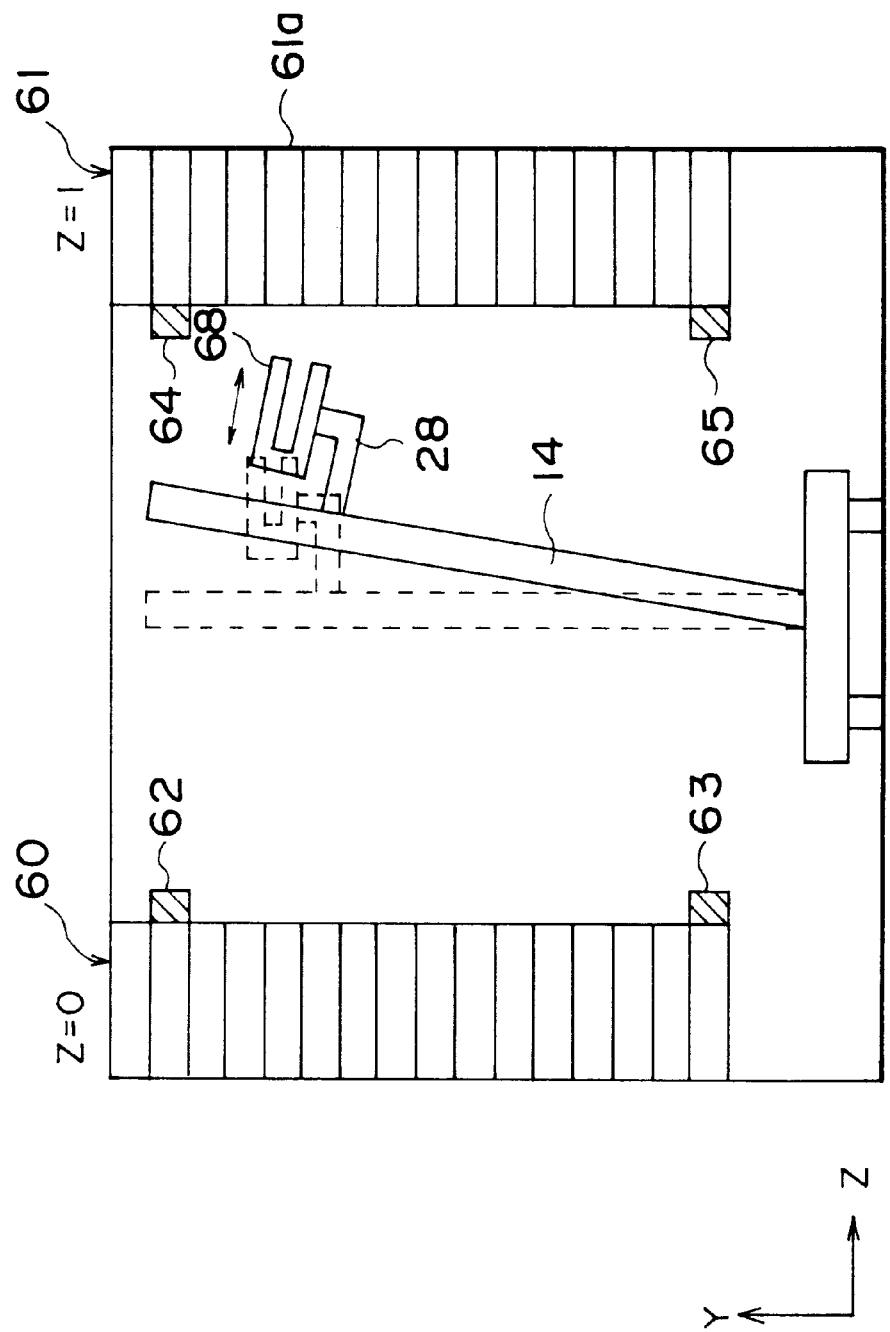

| CELL COLUMN NO. | RELATIVE POSITIONAL FLAG NO. | REFERENCE POSITIONING FLAG NO. | DIFFERENCE OF RELATIVE POSITIONAL FLAG FROM A REFERENCE POSITIONING FLAG (PREDETERMINED VALUE) | DIFFERENCE OF RELATIVE POSITIONAL FLAG (MEASURED) |
|---|---|---|---|---|
| A | (1) | 1 | −20 | −1 |
| B | (2) | 1 | +10 | +2 |
| C | (3) | 2 | −30 | −3 |
| D | (4) | 2 | −15 | +3 |
| E | (5) | 2 | +20 | 0 |
| F | (6) | 3 | −20 | −4 |
| G | (7) | 3 | +10 | −2 |
| H | (8) | 3 | +35 | +3 |
| I | (9) | 4 | −15 | +1 |
| J | (10) | 4 | +20 | +2 |
| K | (11) | 5 | −20 | −5 |
| L | (12) | 5 | +10 | +2 |
| M | (13) | 6 | −30 | −1 |
| N | (14) | 6 | −15 | +1 |
| O | (15) | 6 | +20 | +4 |
| ⋮ | ⋮ | ⋮ | ⋮ | ⋮ |

FIG. 12B

| POSITIONING FLAG NO. | TACHOMETER VALUE FOR POSITIONING FLAG (PREDETERMINED VALUE) | DIFFERENCE OF POSITIONING FLAG (MEASURED) |
|---|---|---|
| 1 | 100 | +5 |
| 2 | 200 | −4 |
| 3 | 300 | +2 |
| 4 | 400 | +3 |
| 5 | 500 | +5 |
| 6 | 600 | +6 |
| ⋮ | ⋮ | ⋮ |

FIG. 12C

| POSITIONING FLAG NO. | TACHOMETER VALUE FOR POSITIONING FLAG (PREDETERMINED VALUE) | DIFFERENCE OF POSITIONING FLAG (MEASURED) |
|---|---|---|
| 1 | 100 | +5 |
| 2 | 200 | −4 |
| 3 | 300 | +2 |
| 4 | 400 | +3 |
| 5 | 500 | +15 |
| 6 | 600 | +16 |
| ⋮ | ⋮ | ⋮ |

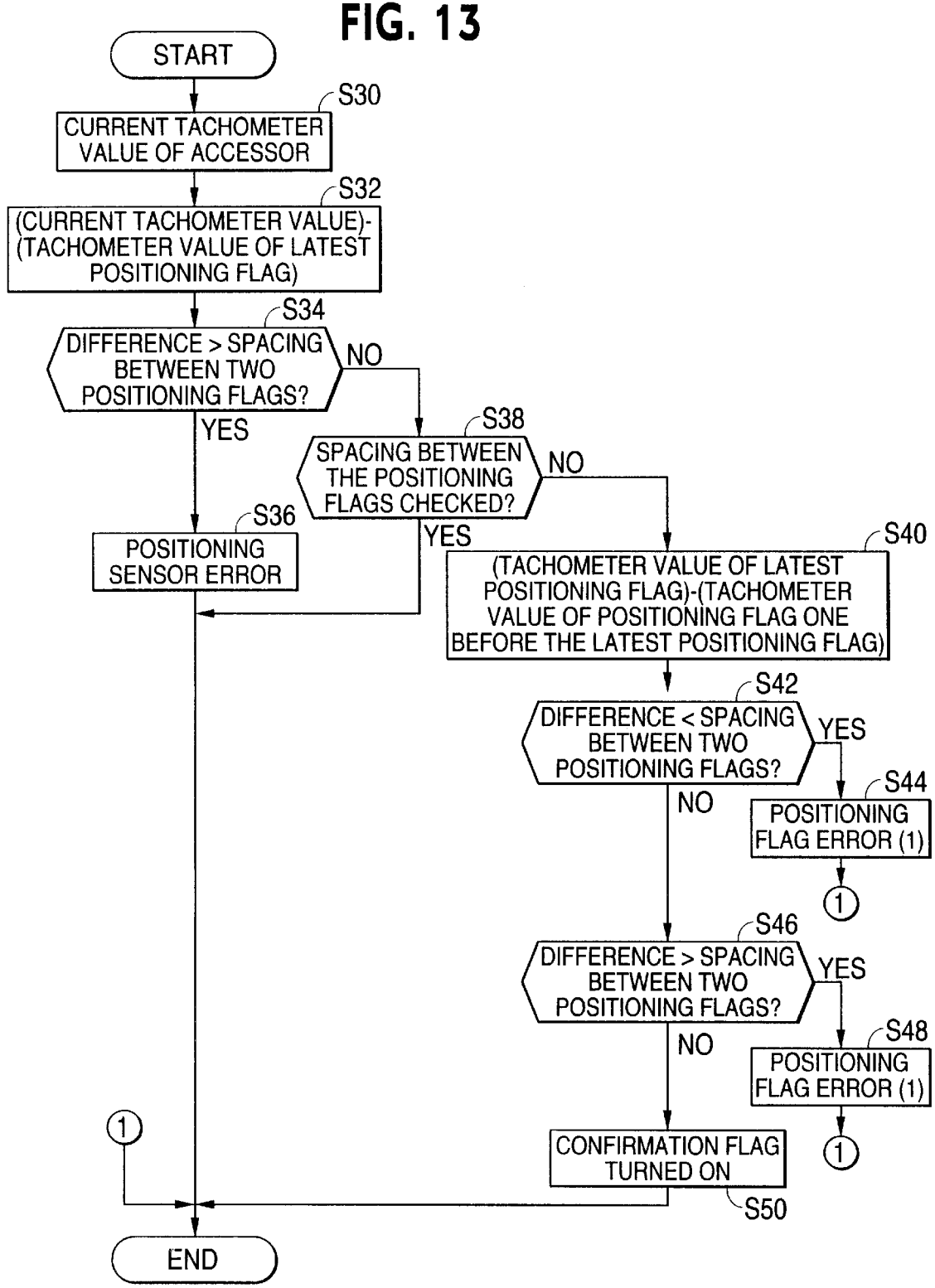

LIBRARY UNIT FOR CALCULATING INCLINATION OF AN ACCESSOR TO CORRECT POSITIONING INFORMATION OF THE ACCESSOR

BACKGROUND OF THE INVENTION

The present invention generally relates to a library unit, and more particularly, to a library unit in which a plurality of cartridge-type recording media (hereinafter referred to as cartridge disks) are stored in a respective cell and a desired cartridge disk is taken out from a cell by a cartridge disk carrying mechanism (hereinafter referred to as an accessor) when a recording and/or a reproducing of information of the medium is carried out.

A library unit, in which a plurality of cartridge disks are stored in a respective cell provided in a respective housing (hereinafter referred to as the frame), and a desired cartridge disk is taken out from a cell by an accessor, which runs through the center portion of the library unit, when a recording and/or a reproducing of information of the cartridge disk is performed, has been used. The cartridge may be returned to the original position (cell) by the accessor after the use.

In such a library unit, a method for positioning the accessor to a correct position of the cell is very important for carrying out proper handling of the cartridge disk. This positioning is often performed by using data of the mechanical structures, such as lengths of the frame in X, Y and Z directions (refer to FIG. 1 ) and a distance between each frame and the accessor, which are input in a memory in advance.

In a conventional library unit, however, there is a case that after carrying out a maintenance or an exchange of an accessor, such mechanical structures are changed and the data indicating a relative positional relationship between the accessor and each frame (cell) can no longer be used. In such a case, it is necessary to measure the relative positional relationships between the accessor and all the frames again. This procedure is of course tedious and time-consuming. Moreover, if an inclination of a shaft of an accessor has occurred after the relative positional relationships between the accessor and each of the frames are measured, the measurement of the positional relationships must be performed once again.

Also, in a conventional library unit, since no relative positional relationships are measured in back and forth directions of the accessor (i.e. the Z direction), no information is available about how far a picker (a cartridge disk holding portion) of the accessor should be moved in order to hold a cartridge disk in a cell. Thus, the picker must always be projected to a position where a holding of a cartridge disk is secured. For this reason, the picker is excessively projected when the position of a desired cell is closer to the picker than a calculated distance, and hits the back wall of the cell. On the other hand, there is a possibility that the picker misses holding the desired cartridge disk when the cell is far away from the picker portion of the accessor.

Moreover, when an entire structure of the plurality of frames is changed, for instance, due to an increment in a number of frames, it is necessary to renew the frame information input to a memory beforehand through an operation panel manually. Thus, if a mistake is made in inputting new information about the frame structures, there is a possibility that an access is made to a non-existing address or a system break-down is caused. Further, in a conventional library unit, when there is a change in a state of a frame, the relative positional relationship has to be measured again for not only the particular frame in which the change is caused but also for all the other frames. Thus, a substantial amount of time must be spent for the required relative positional measurement.

In addition, when a cell shelf comprising a plurality of cells is employed, it is necessary to make a relative positional measurement for all of the cells since a positional relationship or space existing in each cell is not constant. Thus, a number of cells subjected to a positional measurement is increased and, hence, it takes a long time to complete all the measurements.

SUMMARY OF THE INVENTION

Accordingly, it is a general object of this invention to provide a library unit in which the above-mentioned problems are eliminated.

A more specific object of the present invention is to provide a library unit by which time and labor required for exchanging or maintaining an accessor can be decreased.

Another object of the present invention is to provide a library unit by which time and labor required for relative positional measurements after an alteration of a structure of frames can be decreased.

Yet another object of the present invention is to provide a library unit by which an access to a cell can be made accurately.

The objects described above are achieved by a library unit comprising: a plurality of frames; a plurality of cell shelves, each of the cell shelves comprising a plurality of cells arranged in an X-Y plane, the plurality of cell shelfs located in at least one of the plurality of frames, at least one accessor having a picker portion, and a plurality of first reference flags, each of which having substantially the same X-axis coordinate, are provided with each of the frames with a spacing in the Y-axis direction, wherein the plurality of first reference flags are detected by a sensor attached to the picker portion, and a relative inclination angle of the accessor with respect to the Y axis in the X-Y plane is calculated from a difference in position in the X-axis direction of the plurality of first reference flags in order to obtain a correction value in the X-axis direction for each cell.

According to the above library unit, it is possible to obtain a correction value in the X-axis direction for each cell if the accessor is inclined during maintenance, an exchange operation or if frame is inclined for some reason. Thus, the accessor may be accurately positioned at a desired cell.

The objects described above are also achieved by the library unit, wherein a plurality of second reference flags, each of which having substantially the same Z-axis coordinate, are further provided with each of the frames with a spacing in the Y-axis direction, and a relative inclination angle of the accessor with respect to the Y axis in a Y-Z plane is calculated from a difference in position in the Z-axis direction of the plurality of second reference flags in order to obtain a correction value in the Z-axis direction for each cell.

According to the above library unit, it is possible to obtain a correction value in the Z-axis direction for each cell if the accessor is inclined during maintenance, an exchange operation or if frame is inclined for some reason. Thus, the accessor may be accurately positioned at a desired cell.

The objects described above are also achieved by the library unit wherein the accessor is positioned at a desired cell based on the correction values in the X axis and Z axis directions for the desired cell, which are added to a predetermined value for the address of the desired cell.

The objects described above are also achieved by the library unit, wherein the accessor moves in the X-axis direction and the picker portion moves in the Y-axis direction and the Z-axis direction.

According to the above library unit, since the positioning of the accessor is carried out based on the correction values in the X-axis and Z-axis directions, the accessor may be accurately positioned at a desired cell.

The objects described above are also achieved by the library unit, wherein at least one of the plurality of cells accommodates a recording medium.

The objects described above are also achieved by the library unit, wherein the recording medium is a cartridge disk.

According to the above library unit, transfer, storage and control of a recording medium such as a cartridge disk, may be excellently performed.

The objects described above are also achieved by the library unit, further comprising: at least one distinguishing code provided with each of the frames, a reading means, provided with the accessor, for reading the distinguishing code, and a comparing means for comparing frame structures, wherein frame structure information of each frame is obtained from the reading means by reading the distinguishing code, and the frame structure information is compared with frame structure information obtained previously in order to check alteration of frame structure.

The objects described above are also achieved by the library unit, wherein the distinguishing code is a bar code, and the reading means is a bar code reader.

The objects described above are also achieved by the library unit, wherein the accessor detects all reference flags in each frame whose structure is determined to be altered when frame structure information of each frame is compared with corresponding frame structure information previously obtained.

The objects described above are also achieved by the library unit, wherein the accessor detects a couple of reference flags in each frame whose structure is determined to be unaltered when frame structure information of each frame is compared with corresponding frame structure information previously obtained.

The objects described above are also achieved by the library unit, wherein reference flag information previously obtained for each frame, whose structure is determined to be unaltered, is used as it is when information obtained from a couple of reference flags is substantially the same as the corresponding reference flag information previously obtained, and the accessor detects all reference flags again in each frame, whose structure is determined to be unaltered, to renew the reference flag information of each frame when information obtained from the couple of reference flags is not substantially the same as the corresponding reference flag information previously obtained.

According to the above library unit, since reference flags, only in frames whose structure is altered, are measured and it is not required to measure all of the reference flags in frames whose structure is unaltered, time and labor needed for such an operation may be saved.

The objects described above are also achieved by the library unit further comprising: at least one positioning flag provided for each frame, and a position sensor which detects the positioning flag, wherein the position sensor may be used to measure a distance in the X-axis direction between an initial position of the accessor and each of the at least one positioning flag. The result obtained is compared with a predetermined value for a corresponding positioning flag, in order to calculate a difference which is used for controlling the positioning of the accessor to a desired cell.

The objects described above are also achieved by the library unit, wherein a distance in the X-axis direction, between each of the plurality of first reference flags and the positioning flag in the vicinity of a corresponding first reference flag, is measured. The result obtained is compared with a predetermined value for the corresponding first reference flag in order to calculate a difference which is used for controlling a positioning of the accessor to a desired cell.

According to the above library unit, since a positioning of the accessor to a desired cell is carried out using data from the distance between an initial position of the accessor and each of the positioning flags and a distance between each of the plurality of first reference flags and the positioning flag in the vicinity of a corresponding first reference flag, it is only necessary to correct the data of a distance between an initial position of the accessor and each of the positioning flags if a shift is generated between two frames. Thus, time and labor required for such an operation may be saved.

The objects described above are also achieved by the library unit, wherein an error of the position sensor is detected by comparing a running distance of the accessor between positioning flags obtained by a detection of the positioning flags using the position sensor with a predetermined value for the positioning flags.

The objects described above are also achieved by the library unit, wherein a shift of the positioning flag is detected by comparing a running distance of the accessor between positioning flags obtained by a detection of the positioning flags using the position sensor with a predetermined value for the positioning flags.

According to the above library unit, since an error of the position sensor and a shift of the positioning flag may be detected, it is possible to avoid a mispositioning of the accessor caused by such factors.

Other objects and further features of the present invention will be apparent from the following detailed description when read in conjunction with the accompanied drawings.

BRIEF DESCRIPTION OF THE DRAWINGS

FIG. 5 is a simplified diagram for explaining the present invention;

FIG. 7A is a diagram showing a conventional cell shelf;

FIG. 7B is a diagram showing a plurality of cells combined in one block according to the present invention;

FIG. 8 is a simplified diagram showing the entire structure of frames and the accessor located inside the library unit according to the present invention;

FIG. 9A is a diagram for explaining the relative positional measurement for frames after alteration according to the present invention;

FIG. 9B is a diagram for explaining the relative positional measurement for frames after alteration according to the present invention;

FIG. 9C is a diagram for explaining the relative positional measurement for frames after alteration according to the present invention;

FIG. 9D is a diagram for explaining the relative positional measurement for frames after alteration according to the present invention;

FIG. 12A is a table used for explaining a calculation of a tachometer value;

FIG. 12B is a table used for explaining a calculation of a tachometer value;

FIG. 12C is a table used for explaining a calculation of a tachometer value; and FIG. 13 is a flowchart used for checking tachometer values.

DESCRIPTION OF THE PREFERRED EMBODIMENTS

In the following, a principle and the embodiments of the present invention will be described with reference to the accompanying drawings.

Figure 1:
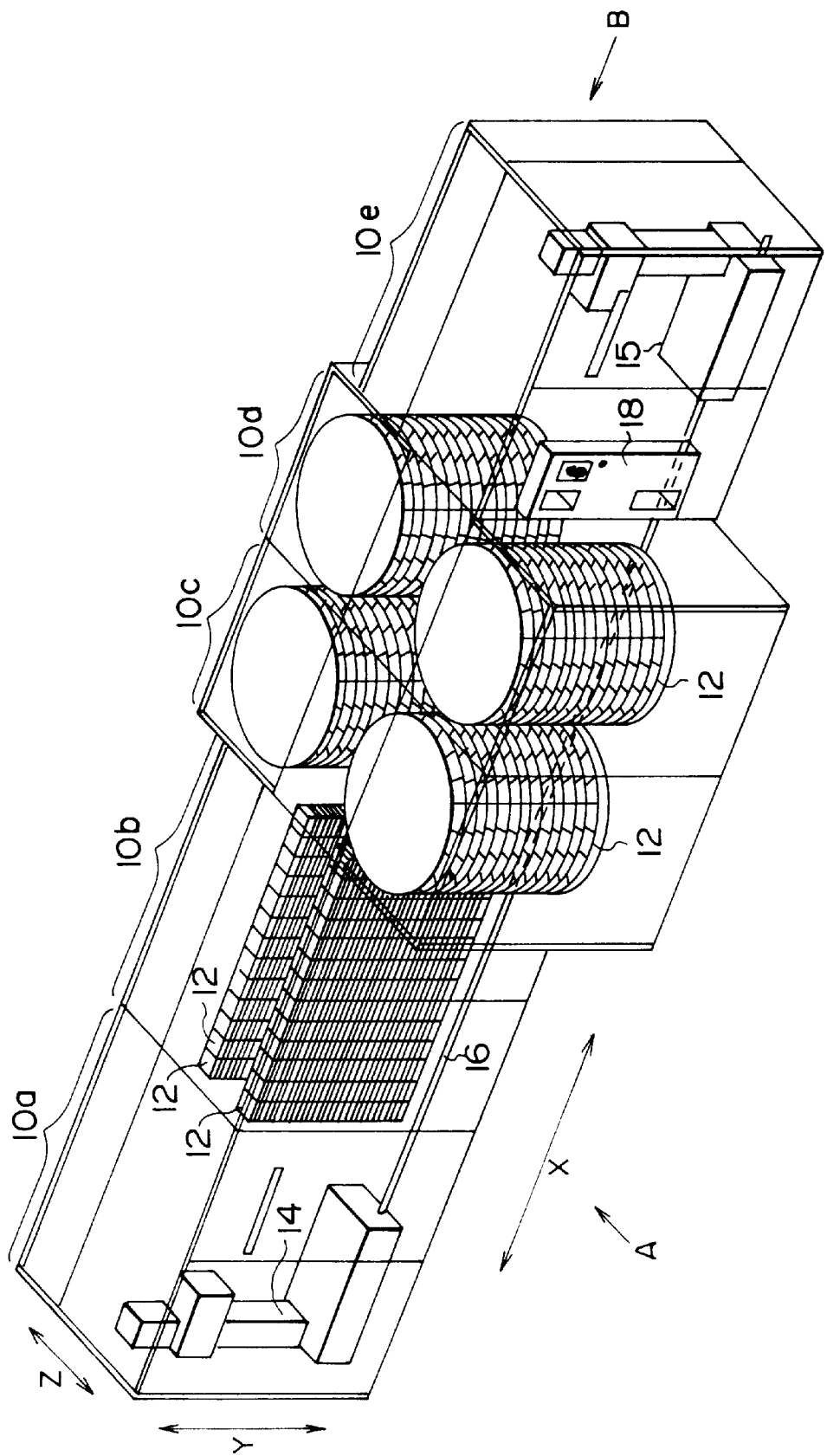
FIG. 1 is a diagram showing an entire structure of a library unit according to an embodiment of the present invention.

FIG. 1 is a diagram showing an entire structure of a library unit according to the present invention. In FIG. 1, the library unit includes a plurality of frames 10a to 10e serially connected in that order, a plurality of cell shelves 12, accessors 14 and 15, a rail 16 and a cartridge disk injection/ejection mechanism 18.

As shown in FIG. 1, the plurality of cell shelves 12, each of which functions as a cartridge disk (recording medium) storing shelf, are accommodated in the frames 10b, 10c and 10d. The cell shelves in the frame 10b are fixed cell shelves and the cell shelves in the frames 10c and 10d, respectively, are rotary cell shelves. The accessors 14 and 15, respectively, move on the center portion of the library unit, guided by the rail 16, in the X direction, indicated by an arrow in FIG. 1, for carrying a cartridge disk. A magnetic recording/reproducing means (not shown in the figure) for conducting a recording or reproducing of a loaded cartridge disk carried by the accessor 14 and 15 is provided with any one of the frames 10a to 10e. Also, the cartridge disk injection/ejection mechanism 18 for carrying out injection and ejection of a cartridge disk is provided with the frame 10e as shown in the figure in this embodiment.

Figure 2:
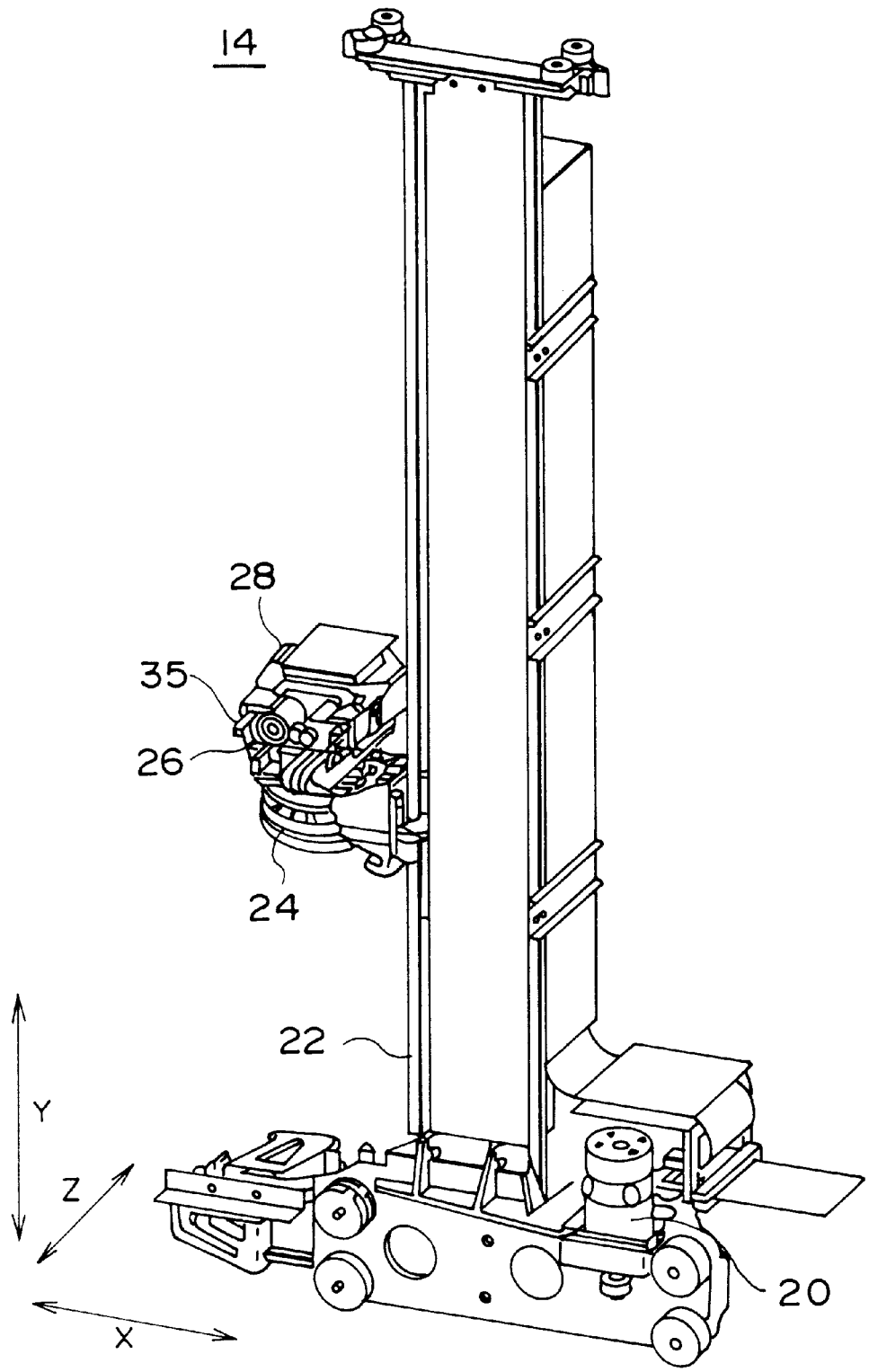
FIG. 2 is a diagram showing a structure of an accessor used in the library unit according to the present invention.

FIG. 2 is a diagram showing a structure of an accessor according to an embodiment of the present invention. Note that although the following description is written for the accessor 14, the same principle may also apply to the accessor 15.

As shown in FIG. 2, the accessor 14 of the present invention includes an X-direction driving portion 20, a Y-direction driving portion 22, a Z-direction driving portion 24, a hand portion 26, a picker portion 28 and a sensor 35.

The X-direction driving portion 20 moves the accessor 14 in the X direction indicated by the arrow X in FIG. 2. The Y-direction driving portion 22 moves the hand portion 26 in the Y direction (a height direction) indicated by the arrow Y in FIG. 2. The Z-direction driving portion 24 moves the hand portion 26 in the Z direction indicated by the arrow Z also shown in FIG. 2. The hand portion 26 is operated to hold a cartridge disk. The picker portion 28 is a mechanism to move the hand portion 26 in back and forth directions so that the hand portion 26 can reach a desired cartridge disk in a cell.

The above-mentioned driving portions 20, 22 and 24, hand portion 26 and picker portion 28, respectively, are initialized when the device is switched on and power is supplied, in order to check if each of the mechanism portions can function properly. Also, a step motor (not shown in the figure) provided with each of the above-mentioned portions is controlled by a pulse signal of a tachometer (hereinafter abbreviated as a tachometer value) supplied to the respective motor. The accessor 14 possesses a means to integrate (calculate) the tachometer value for each motor. After the initialization, the accessor 14 receives an operational command (MOVE command) from an upper device and calculates a tachometer value for each motor from an ordered address contained in the command parameter. Each of the motors is driven based on the calculated tachometer value and the accessor 14 is brought into the position of an objective address. After that, a cartridge disk is taken out from (or put into) a cell of the objective address by the operation of the picker portion 28 of the accessor 14.

Since the library unit is relatively large in size, a dimensional error associated with it may also become considerably large. The possibility of error is increased as the number of frames connected to the unit is increased. Thus, it is difficult to carry out an accurate positioning of the accessor by using only tachometer values obtained from the sizes of the mechanical structures. Therefore, it is necessary to effect relative positional measurements with regard to the accessor 14 and each cell in order to make a correction of a positional error generated.

Figure 3:
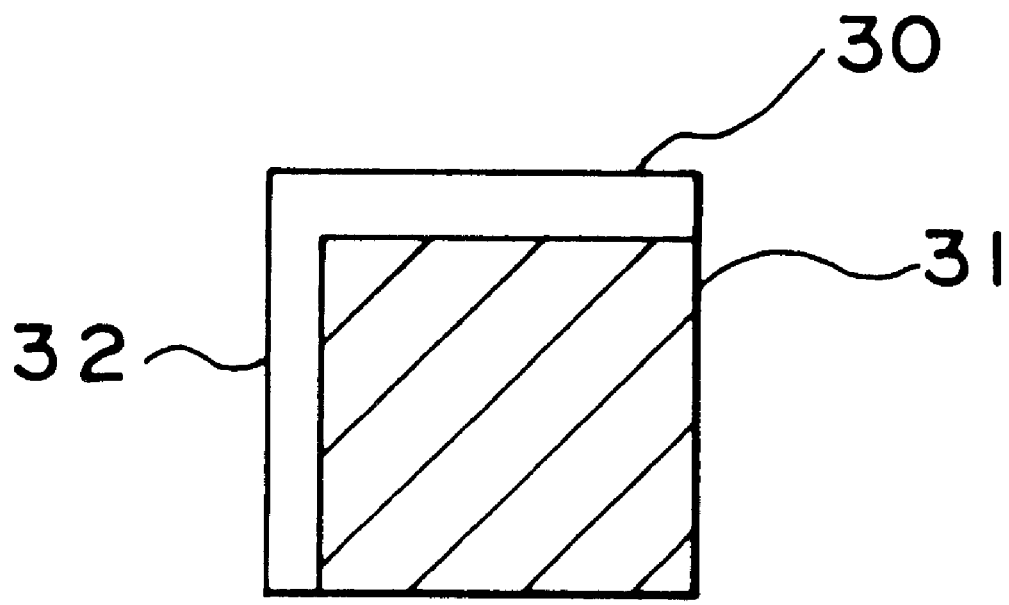
FIG. 3 is a diagram for explaining a reference flag used in the present invention.

FIG. 3 is a diagram showing an embodiment of a reference flag 30 which used for the relative positional measurement in the present invention. The reference flag 30 is attached to a portion or portions of each of the frames 10a to 10e. As mentioned above, flag 30 is used for the relative positional measurement. As shown in FIG. 3, the reference flag 30 is comprised of a matte black portion 31 of a square shape (17 mm×17 mm surface area) and a reflective portion 32 (3-mm width) adjacent to two sides of the matte black portion 31. The reference flag 30 may be attached to, for example, all the cells 12 having a Y coordinate of zero.

In addition, the sensor 35, which detects information from the reference flag 30, is fixed to an end of the picker portion 28. The detection of the reference flag 30 is carried out by first bringing the sensor 35 into the central position of the reference flag 30 shown in FIG. 3. The reading a tachometer value at the moment the sensor 35 passes over the reflective portion 31 of the reference flag 30 when the sensor 35 is moved in the up and down directions (Y direction) and the right and left directions (X direction) over the reference flag 30. Note that although the operation to bring the sensor 35 into the central position of the reference flag 30 is performed based on the data of the size of mechanical structures input in a memory beforehand, if a position of the sensor 35 is already shifted significantly from the center of the reference flag due to, for instance, a strain of the accessor, a correction of position of the accessor 14 by the relative positional measurement is not possible. In order to carry out the positional correction by the relative positional measurement, it is necessary that a light beam, etc., from the sensor 35 must be located inside the matte black portion 31 of the reference flag 30 when the sensor 35 is brought into the position of the reference flag 30.

The actual procedure of the relative positional measurement may be carried out as follows. First, a tachometer value, which is necessary to move the accessor 14 to a position slightly in front of the position of the reference flag 30, is calculated based on input data of fixing positions of reference flags, and the accessor 14 is moved to the position. The accessor 14 is further moved from the position in a direction by which the accessor 14 passes over the reference flag 30 and it is checked to see if there is any response from the sensor 35 to the reference flag 30. The tachometer value obtained when the sensor 35 detects the reference flag 30 is stored. Then, the difference between the input data of the fixing position of the reference flag 30 and the obtained data is calculated and the resulting value is stored as a correction value. The relative positional measurements are performed for each frame.

Each cell address carries data which should be used at a time of positioning the accessor 14. When an address is given by a command, data which should be used for the address is retrieved and the relative positional data for the address are added. In this way, the picker portion 28 of the accessor 14 can be accurately positioned at the objective cell.

It is necessary that the picker portion 28 of the accessor 14 must be located within a certain range from a position of the reference flag 30 to perform the relative positional measurement. That is, the sensor 35 must be located in a position where it is able to detect a signal from the reference flag 30 when the picker portion 28 is moved in front of the flag 30. If the sensor 35 is able to detect the flag 30, this indicates that a positional correction can be made by the relative positional measurement. Therefore, the positioning of the accessor 14 may be performed based on the correction made by the relative positional measurement.

On the other hand, if the sensor 35 cannot detect the flag 30, this indicates that positions of mechanical structures such as the accessor 14 or the frames are significantly changed for some reason and a correction of the position of the accessor cannot be made by the relative positional measurements. In such a case, it is necessary to exchange the construction part(s) of the accessor 14 or frame(s) which is/are causing the problem.

Figure 4A:
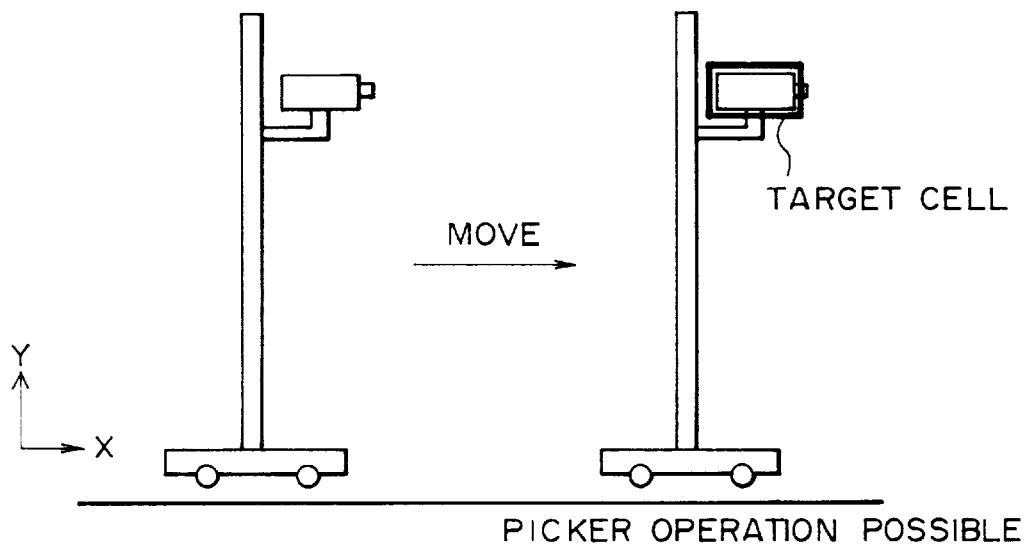
FIG. 4A is a diagram for explaining a picker operation of the accessor according to the present invention.
Figure 4B:
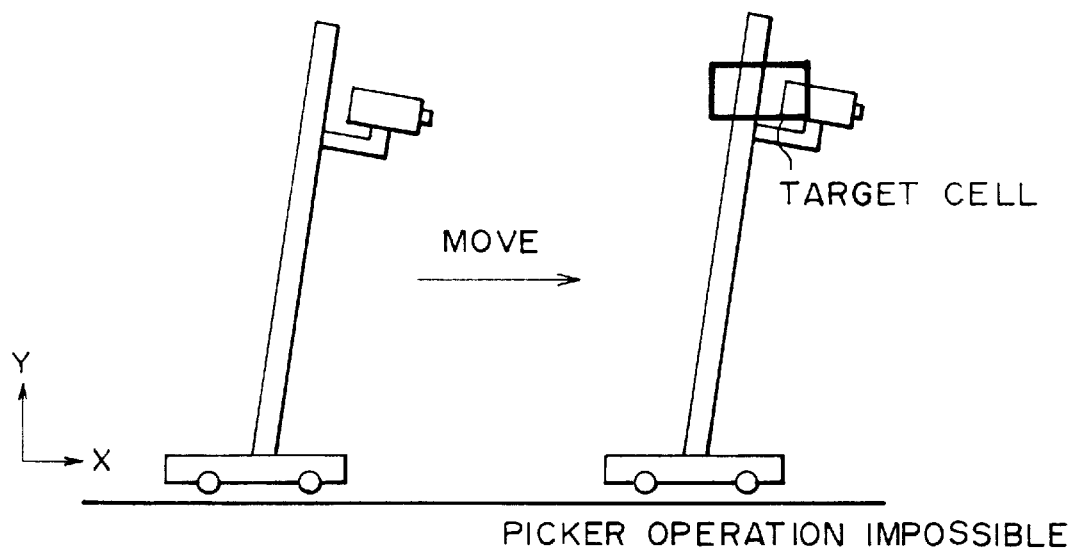
FIG. 4B is a diagram for explaining a picker operation of the accessor according to the present invention.

FIGS. 4A and 4B are diagrams for explaining a proper and an improper picker operation of the accessor 14(15). In FIG. 4A, a case is shown in which the picker portion 28 of the accessor 14 moves to a position of a cell (indicated by a bold line) in order to take out a cartridge disk contained in the cell. As mentioned above, the positioning of the accessor 14 is carried out based on a tachometer value calculated using the data of the sizes of the mechanical structures including those of the fixing positions of the reference flags and a correction value, which is added to the tachometer value, obtained from the relative positional measurement. Since the condition of the accessor 14 shown in FIG. 4A is normal and there is no inclination of the accessor 14, a picker operation can be performed normally and a cartridge disk may be taken out from the cell without having any problems.

As for the accessor 14 shown in FIG. 4B, on the other hand, because the accessor 14 is inclined in the right hand direction with respect to the Y axis, the position of the picker portion of the accessor 14 is shifted from the position of the target cell (indicated by a bold line). Thus, a normal picker operation cannot be performed and it is not possible to take out a cartridge disk from the cell (if the same correction value as used in the case shown in FIG. 4A is employed).

In the case shown in FIG. 4B, however, an accurate positioning of the accessor may be performed by carrying out the relative positional measurement again and using corrected data of the relative positional relationship between the accessor 14 and each cell. Thus, it is actually possible to take out a cartridge disk from the cell even using the accessor 14 shown in FIG. 4B. A problem associated with the case shown in FIG. 4B is that the positional relationship measurement must be carried out again for all the measuring points. Taking into account the fact that the corrected data, which will be obtained after the relative positional measurements, are data in which the inclination angle of the accessor 14 with respect to the y axis is added to the original data and there is no change at all for the other elements such as condition of all the reference flags, the relative positional measurement performed again is merely an inefficient, lengthy, time-consuming procedure. In order to solve this problem, the present invention provides the following.

FIG. 5 is a simplified diagram showing an upper reference flag 41 and a lower reference flag 42, both for correcting an inclination in the X direction, together with a cell shelf 43 and the accessor 14. A (plurality of) middle reference flag 44 for correcting the inclination in the X direction may be arbitrarily added between the upper and the lower reference flags 41 and 42. As shown in FIG. 5, the upper and the lower reference flags 41 and 42 may be provided at a respective position on the cell shelf 43 (on the X-Y plane), having the same X coordinates but different Y coordinates. According to an embodiment of the present invention, these reference flags 41 and 42 are used for carrying out relative positional measurements in the X direction. Using two data obtained from the measurements, an inclination angle of the accessor 14 is obtained. Thus, a tachometer value, which will be given to the accessor 14 for an accurate positioning, can be calculated from the inclination angle of the accessor 14 and the Y address of the target cell.

As mentioned above, when the picker portion 28 of the accessor 14 is located within a certain range (±8.5 mm in this embodiment) from a position of the reference flag 30, it is determined that there is no significant inclination of the accessor 14 and a cartridge disk may be taken out from or put into a cell.

Figure 6:
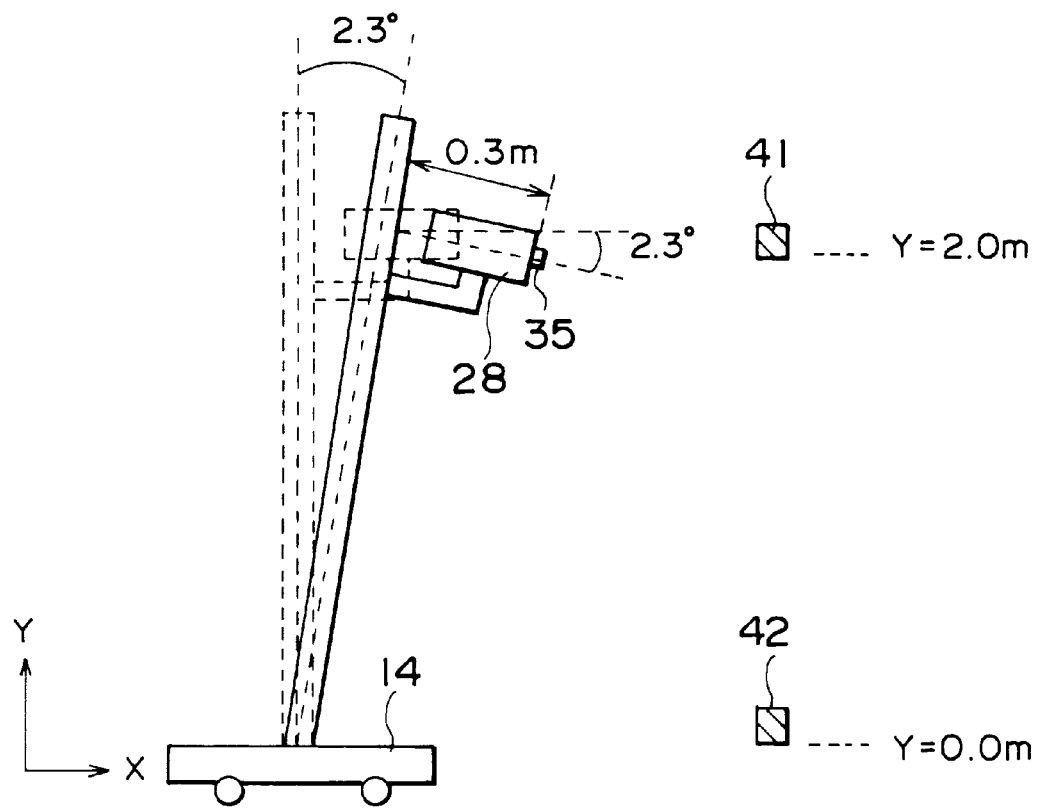
FIG. 6 is a diagram for explaining a calculation of an inclination angle of an accessor.

FIG. 6 is a diagram for explaining a calculation of an inclination angle of an accessor. As shown in FIG. 6, a shaft of the accessor is inclined in the right-hand-side direction with respect to the Y axis. The length of the accessor in the Y axis direction is 2.0 meters and the sensor 35 fixed to the end of the picker portion 28 is located 0.3 meter away from the (inclined) central axis of the accessor. The picker portion 28 moves in the back and forth directions at a right angle to the central axis (Y axis) of the accessor. Also, the two reference flags 41 and 42 are provided at 2.0 meters on the Y axis and at an origin (0,0), respectively.

Now, suppose results of the relative positional measurement of the reference flags 41 and 42 for correcting the X direction inclination, respectively, were as follows:

flag 41 X: −8.5 mm and flag 42 X: −0.5 mm then, the inclination angle of the accessor with respect to the Y axis can be calculated as follows:

$\tan^{-1}((8.50-0.50)/2000)=0.23$

Thus, according to the relative positional measurement of the above two flags 41 and 42, it may be concluded that the accessor is inclined 0.23 degree with respect to the Y axis.

Since the accessor is inclined 0.23 degree with respect to the Y axis, it is determined that a carriage carrying the picker portion 28 of the accessor is inclined 0.23 degree with respect to the X axis assuming that the angle of the carriage with respect to the shaft (Y axis) of the accessor is originally 90 degrees. Thus, the sensor 35 fixed to the end of the picker portion 28 is also inclined 0.23 degree with respect to the X axis.

Since the sensor 35 is inclined, its position is shifted with respect to the Y axis (i.e., the height of the sensor 35 is changed). The degree of shifting a of the sensor 35 with respect to the Y axis can be calculated as follows:

2000: (8.5−0.5)=300: α,

α=1.2

Thus, it is determined that the position of the sensor 35 is shifted 1.2 mm with respect to the Y axis. However, since the shifting of 1.2 mm with respect to the Y axis is within the range of error (when the range is ±1.5 mm, for instance) for a select/restore of a cartridge disk, it is possible to take out or put in a cartridge disk. Therefore, in cases where the accessor is inclined with respect to the Y axis direction, it is possible to carry out the select/restore operation if relative positional measurements of reference flags for correcting the inclination in the X direction can be performed.

Referring back to FIG. 5 again, how the time required for relative positional measurements can be saved will be explained.

FIG. 5 is a simplified diagram of the library unit shown in FIG. 1, looking from the direction A indicated by the arrow. As shown in the figure, the number of cells contained in the cell shelf 43 is ten. The upper reference flag 41 and the lower reference flag 42, both for correcting an inclination in the X-axis direction are provided for the first and tenth cells, respectively, of the cell shelf 43. The position of the target cell in this case is a 500 tachometer value away from the origin with respect to the X-axis direction and fifth from the bottom in the Y-axis direction. Supposing that the relative position of the upper and the lower reference flags 41 and 42 in the X-axis direction prior to the exchange of the accessor is a 100 tachometer value, respectively. The relative position of the upper and the lower reference flags 41 and 42 in the X-axis direction after the exchange of the accessor is a 128 tachometer value and a 110 tachometer value, respectively. Then, the inclination angle with respect to the Y axis, assuming a linear distribution of errors, is calculated as follows:

(128−110)/(10−1)=2

Therefore, the rate of an X-direction tachometer value for one cell with respect to the Y axis direction is a two tachometer value.

Since the target cell is the fifth cell from the bottom:

2*(5−1)=8

Thus, the tachometer value to which a correction based on the measurements of the reference flags is calculated as follows:

500+8=508

Therefore, by giving a 508 tachometer value in the X direction to the accessor, it is possible to make an accurate positioning to the target cell.

Thus, according to the present invention, it is not necessary to make measurements for all the relative positional flags again after, for example, the exchange of the accessor, and the time required for relative positional measurements can be saved.

Although a linear approximation is used for the correction since only the two flags are used in the above embodiment, it is possible to carry out a curvilinear approximation for the correction when the middle reference flag(s) 44 is(are) used in addition to the upper and the lower reference flags 41 and 42. Conventional methods of the curvilinear approximation may be employed in the present invention.

FIG. 7A shows a conventional cell shelf 46 looking from the Z direction shown in FIG. 1. As shown in FIG. 7A, the cell shelf 46 has a structure in which cells are partitioned in a row. The space available for a cell is not constant and there may be distortion in the Y-axis direction of the shelf. Thus, it is conventionally required to perform a relative positional measurement for each row.

FIG. 7B shows, on the other hand, a block-type cell shelf 48 comprising a plurality of cells combined in one block form. For this kind of cell shelf, a correction value can be calculated if an inclination angle of entire block and a shifted amount at a couple of points are obtained. Thus, it is not necessary to carry out relative positional measurements for each row.

In FIG. 7B, relative positional flags (upper, middle and lower) 50 to 55 are provided for the block 48. According to the present invention, the inclination of the block 48 is obtained by the relative positional measurements of these flags 50 to 55, and a correction value for each row (cell) is calculated based on the result of the relative positional measurement obtained. Therefore, a number of relative positional measurements carried out may be decreased compared with the conventional methods and the time required for the relative positional measurements can also be shortened. Note that although six relative positional flags are used in FIG. 7B, it is possible to use the flags 50 and 54 only. Thus, it is also possible to use a linear or curvilinear approximation for the calculation in this embodiment according to the number of reference flags used.

FIG. 8 is a simplified diagram showing the entire structure of frames inside the library unit according to the present invention, looking from the direction B indicated by the arrow shown in FIG. 1. Referring to FIG. 8, how a cartridge disk contained in a cell may be taken out from the cell will be explained. In FIG. 8, a cell shelf 60 having a coordinate of Z=zero and a cell shelf 61 having a coordinate of Z=1 are shown in the left and right hand sides of the figure, respectively, together with the accessor 14.

Suppose the accessor 14 is inclined in the Z=1 direction as shown in the figure due to, for instance, a maintenance or an exchange of the accessor. In that condition, if the picker portion 28 of the accessor 14 is moved towards the cell shelf 61 to hold a cartridge disk contained in a cell, since the accessor 14 has been inclined in the Z=1 direction, the picker portion 28 may be pushed further after it reaches the back wall 61a of the cell shelf 61, provided that the same tachometer values used for controlling the position of the accessor 14 before the maintenance or exchange of the accessor are employed. In case of the cell shelf 60 having a coordinate Z=0, on the other hand, the picker portion 28 may not be able to reach a position where it can surely hold a cartridge disk in a cell if the same tachometer values used for controlling the position of the accessor 14 before the maintenance or exchange of the accessor are employed. Thus, there is a possible danger that the picker portion 28 drops the cartridge disk.

To solve the above problems, therefore, upper and lower reference flags 62 and 63 for correcting an inclination in the Z direction are provided for the cell shelf 60 on the Z=0 surface and upper and lower reference flags 64 and 65 for correcting an inclination in the Z direction are provided for the cell shelf 61 on the Z=1 surface in accordance with the present invention. In addition, a sensor 68 for detecting the reference flags for correcting an inclination in the Z direction is provided at an end of the picker portion 28.

The relative positional measurement may be carried out as follows. After moving the picker portion 28 to a position where the sensor 68 responds to the flag 62 (or 63, 64, 65) when the picker portion 28 is moved perpendicular to the X-Y plane, the picker portion 28 is inserted in a cell by the back and forth movements of the picker portion 28 and the tachometer values for a picker operation system at the moment the sensor 68 passes over the flag position are measured. As for the cell shelf 60 having a coordinate of Z=0, data from the reference flags 62 and 63 are used for obtaining the inclination of the accessor 14 with respect to the Y axis in the Y-Z plane. As for the cell shelf 61 having a coordinate of Z=1, data from the reference flags 64 and 65 are used for obtaining the inclination of the accessor 14 with respect to the Y axis in the Y-Z plane. Moreover, when the accessor 14 is positioned at a cell position by a MOVE command, a correction value in the Z direction is obtained from a Y address and the degree of inclination of the accessor 14 with respect to the Y axis in the Y-Z plane.

By the above-mentioned operation, it is possible to determine a proper movement (projecting distance) of the picker portion 28 of the accessor 14. Thus, in the case shown in FIG. 8, the projecting distance of the picker portion 28 is decreased for the cell shelf 61 and the projecting distance of the picker portion 28 is increased for the cell shelf 60. A linear approximation or a curvilinear approximation can also be used for obtaining a correction value in this embodiment according to the number of reference flags used and conventional calculation methods may be employed for this purpose.

FIGS. 9A through 9D are diagrams showing examples of connection patterns of frames in the library unit according to the present invention. Among the figures, FIGS. 9A and 9C, respectively, show the structures of frames prior to the alteration of the frame structure and FIGS. 9B and 9D, respectively, show the structures of frames after the alteration of the frame structure.

In FIGS. 9A through 9D, the numeral assigned for each frame indicates, respectively, a frame code (distinguishing information). Each of the frame codes is written in a respective bar code and the bar code is attached to a lower portion of each frame. The position of the bar code is adjusted so that it opposes a bar code reader (not shown) provided with the X-direction driving portion 20 of the accessor 14. The bar codes are read by the bar code reader.

Referring to FIGS. 9A and 9B, a new frame 1D (shaded) is provided between the frame 1E and the frame 01 in FIG. 9B. In this case, only the two frames, 1D and 01, have been involved with a transferring operation which includes a detachment of a connecting portion of a corresponding frame. As for the case shown in FIG. 9B, because there is no relative positional data available for the frame 1D, it used to be necessary, as mentioned above, to carry out a relative positional measurement again for all the measuring points of the frames. This is a time consuming procedure, especially taking into account the fact that all the measuring points provided with all the frames except the frame 1D were already measured once. Therefore, according to the present invention, the relative positional measurement for only a couple of points in the frames except the frame 1D are performed, and the resulting data are compared with the corresponding data previously obtained. If the difference between the two are within the allowable range, the previous data are used without having any correction. If the difference between the two are significantly large and over the allowable range, all the measuring points in a frame as well as the ones provided with the frame 1D are measured again.

Referring to FIGS. 9C and 9D, on the other hand, frames 32, 22 and 1E are newly added as shown in FIG. 9D. In this type of case, almost all the frames are involved with the transferring operation and the connecting portion of each frame is separated. Thus, the relative positional measurement has to be carried out for all the measuring points.

Figure 10:
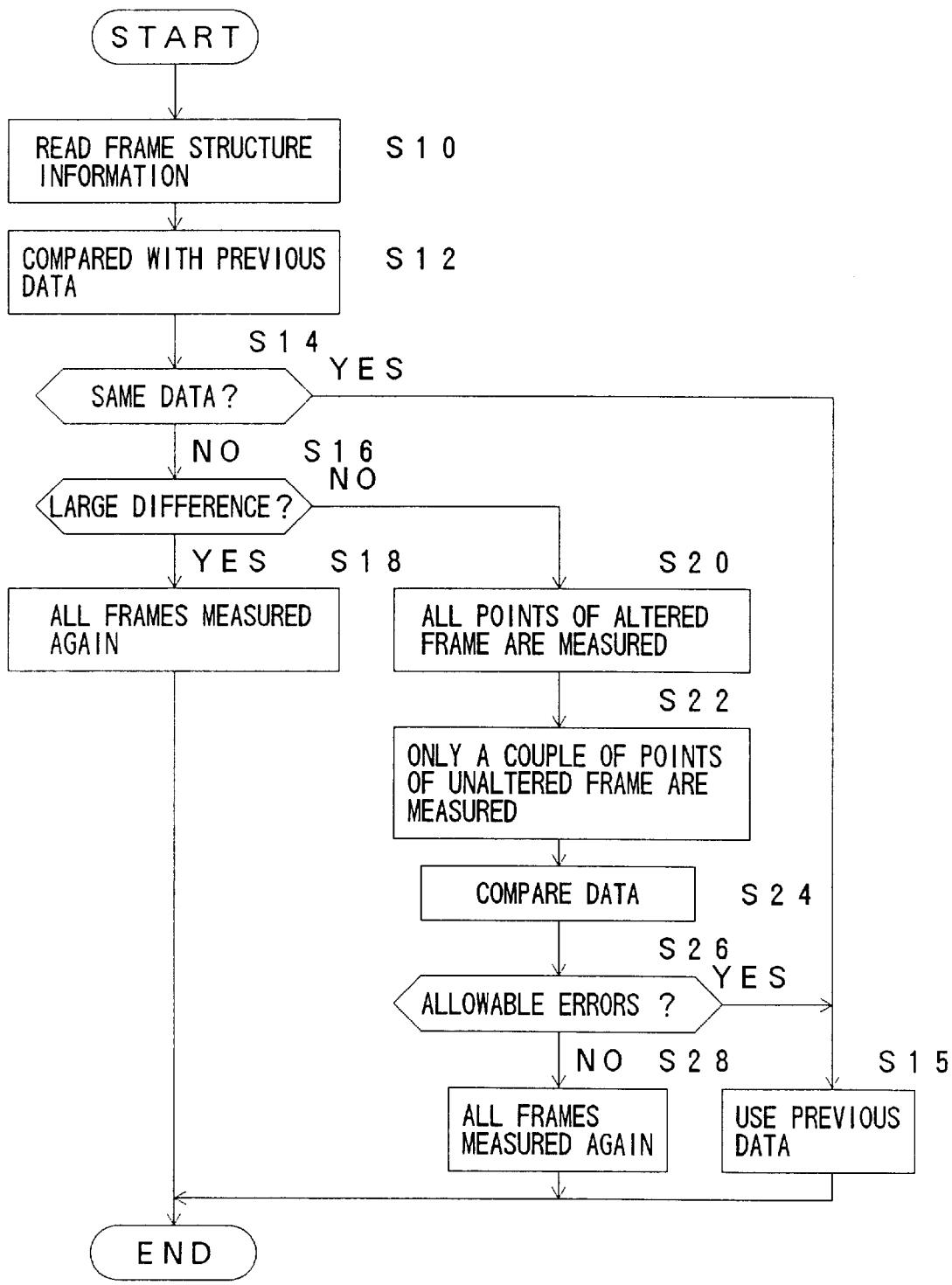
FIG. 10 is a flowchart showing pathways of a relative positional measurement.

Whether the relative positional measurements are carried out for all the measuring points or for only the selected points is determined based on the flowchart shown in FIG. 10.

By using the processes described in FIG. 10, it is possible to carry out the relative positional measurements in a most suitable way for a particular case and the time required for the measurements after the alteration of a frame structure can be decreased.

As mentioned above, the relative positional measurements are carried out in accordance with the flowchart shown in FIG. 10 in the present invention. Referring to FIG. 10, information about a frame structure after the alteration of the structure is read in step S10 and the information is compared with the frame information obtained prior to the alteration of the frame structure in step S12. In step S14, it is determined whether the structure of frames before and after the alteration is the same or not. If they are the same, it is determined to use the previous data in step S15 and the operation is terminated. If they are different, it proceeds to step S16.

In step S16, the degree of difference between the two frame data are considered. If the difference is significantly large (as in the case shown in FIGS. 9C and 9D, for instance), it is determined to proceed to step S18. In step S18, relative positional measurements are carried out for all the measuring points and the operation is terminated. If the difference is significantly small, as in the case shown in FIGS. 9A and 9B, for example, it is determined to proceed to step S20.

In step S20, a relative positional measurement is carried out again for only the measuring points of frames of which a connecting relationship with adjacent frame(s) has been altered, as in the case of frames 1D and 01 shown in FIG. 9B, for instance. Then, in step S22, relative positional measurements are performed only for a couple of points of frames, each of whose structure has not been altered (frames other than 1D and 01 shown in FIG. 9B, for example). The term "couple of points" means the points which can represent the entire data of a certain frame. After this, data obtained from the above-mentioned couple of points are compared with the data obtained prior to the alteration of the structure of frames in step S24. Then, it is determined if the difference between the two data are within the predetermined allowable range in step S26. If it is within the range, it goes to step S15, in which it is determined to use the previously obtained data, and the operation is terminated. If it is not within the allowable range, it proceeds to step S28, in which all the measuring points of the frames are measured again, and the operation is terminated.

Figure 11A:
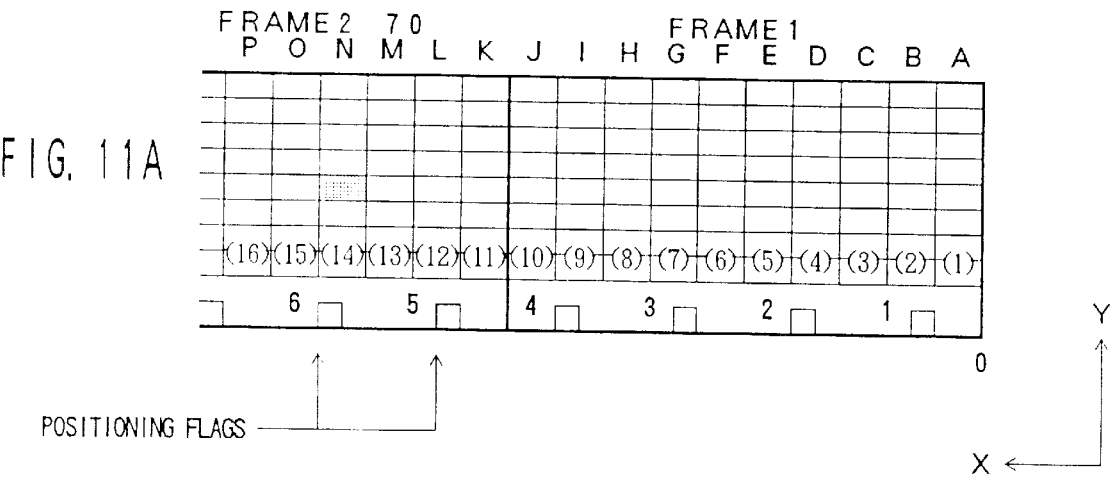
FIG. 11A is a diagram for explaining a calculation of a tachometer value in the X-axis direction.
Figure 11B:
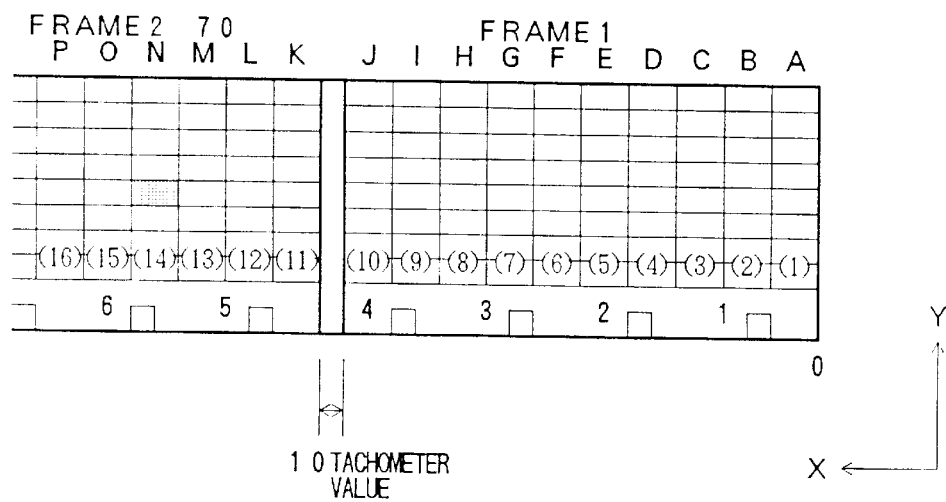
FIG. 11B is a diagram for explaining a calculation of a tachometer value in the X-axis direction.

When the accessor is positioned at a cell, it is necessary to calculate the tachometer value for an objective position. FIGS. 11A and 11B are the diagrams for explaining the calculation of a tachometer value for an objective cell.

In FIGS. 11A and 11B, numbers in brackets indicate, respectively, a relative positional flag for a cell column which is distinguished by A, B, C, . . . , shown on top of each diagram, and squares indicated by numbers shown in the bottom part of each frame indicate, respectively, a reference positioning flag. The reference positioning flag is a flag having a similar shape and function as the relative positional flag shown in FIG. 3. The flag is often provided at a lower portion of a cell shelf and is detected by a position sensor fixed to the X-direction driving portion 20. The reference positioning flags are provided at a constant interval (spacing) in the X-axis direction. At least one reference positioning flag is provided for each frame.

The relationships between each of the relative positional flags and the corresponding reference positioning flag are shown in FIG. 12A, together with a difference of each relative positional flag from a corresponding reference positioning flag, etc.

Referring to FIG. 11A, a calculation of the tachometer value in the X direction for the position of a cell 70 (shaded), when the accessor is positioned at the cell 70 of a frame 2, will be explained. Note that although a plurality of relative positional flags are usually provided in the Y-axis direction of the same X address in actual cases and correction values vary in accordance with the height of the Y address, only one flag in the Y-axis direction of the same X address is used here as a convention.

(1) Firstly, the relative positional flag for a target cell is retrieved.

As indicated in FIG. 12A, the relative positional flag for the cell column number N, to which the cell 70 belongs, is (14).

(2) Secondly, the reference positioning flag for the relative positional flag is retrieved.

As indicated in FIG. 12A, the reference positioning flag for the relative positional flag (14) is the flag 6.

(3) Thirdly, a tachometer value obtained from the predetermined value of the reference positioning flag is retrieved.

As shown in FIG. 12B, the predetermined value of the reference positioning flag 6 is 600.

(4) Fourthly, a difference of the reference positioning flag from the predetermined value is considered (i.e., a correction value obtained from a relative positional measurement is added).

As shown in FIG. 12B, the difference of the positioning flag 6 from the predetermined value is +6.

(5) Fifthly, a difference (predetermined value) of the relative positional flag retrieved in (1) from the reference positioning flag is added.

As shown in FIG. 12A, the difference of the relative positional flag (14) from the reference positioning flag 6 is −15.

(6) Finally, a difference of the relative positional flag from the predetermined value is considered (i.e., a correction value obtained from a relative positional measurement is added).

As shown in FIG. 12A, the difference of the relative positional flag (14) from the predetermined value is +1.

Thus, from the above steps (1) to (6), the tachometer value in the X direction can be calculated as follows:

| | | |
|---|---|---|
| 600 | ⋯ | setting value of the reference positioning flag |
| +6 | ⋯ | correction value of the reference positioning flag |
| −15 | ⋯ | setting value of the relative positional flag |
| +1 | ⋯ | correction value of the relative positional flag |
| = 592 | | |

Therefore, the tachometer value in the X direction for the cell 70 is 592.

FIG. 11B shows a case in which there is no alteration of frames but a spacing equivalent to a 10 tachometer value is formed between the frame 1 and the frame 2.

For the case shown in FIG. 11B, relative positional measurement data from the reference positioning flags become as shown in FIG. 12C. It is obvious from FIG. 12C, compared with FIG. 12B, that a 10 tachometer value is added to the difference of the positioning flags for the frame 2 (namely the positioning flags 5 and 6). As mentioned above, the original data (i.e., data shown in FIG. 12A) of a frame which has no significant alteration can be used without any change. Therefore, the tachometer value in the X direction for the cell 70 shown in FIG. 11B

| | | |
|---|---|---|
| 600 | ⋯ | setting value of the reference positioning flag |
| +16 | ⋯ | correction value of the reference positioning flag |
| −15 | ⋯ | setting value of the relative positional flag |
| +1 | ⋯ | correction value of the relative positional flag |
| = 602 | | |

Thus, according to the present invention, it is also very easy to make a correction in accordance with a spacing formed between frames and, hence, a positioning error of the accessor may be readily avoided.

The accuracy of the count of the tachometer value with respect to the rotation of a motor can be confirmed by comparing the actual tachometer value obtained when the motor is rotated a certain number of times (measured value) with a calculated tachometer value (theoretical value).

In the relative positional measurement using the reference positioning flags according to the present invention, a comparison of obtained relative positional data with a current position of the accessor is made at a constant interval during a transfer of the accessor, in order to check a condition of the accessor, frames, flags and so on. The checking is made based on a flowchart shown in FIG. 13.

Referring to FIG. 13, a current tachometer value of the accessor is obtained in step S30, and then the difference between the obtained tachometer value and the tachometer value of the latest positioning flag (i.e., the last flag the accessor passed by during the transfer) is calculated in step S32.

It is determined, in step S34, if the difference of the two tachometer values is more than a value which is equivalent to a spacing between two positioning flags. If it is, then it is considered that no response of a position sensor is made despite the fact that the accessor has passed a positioning flag. Two possible causes of the incident are malfunction of the position sensor and a missing (or something wrong with a) reference positioning flag. Thus, the process proceeds to a step S36, in which an alarm indicating an error is beeped, and the process is terminated.

On the other hand, if the difference does not exceed the value which is equivalent to a spacing between two positioning flags, then the process proceeds to step S38.

In step S38, it is determined if the difference between the tachometer value of the latest positioning flag and the tachometer value of the positioning flag located one before the latest positioning flag is already checked. If it is already checked, then it is determined to terminate the process. If it is not, then the process goes to step S40 in which the difference between the tachometer value of the latest positioning flag and the tachometer value of the positioning flag located one before the latest positioning flag is calculated.

Then, in step S42, it is determined if the calculated difference is smaller than the spacing between two positioning flags. If it is, then it is considered that a positioning flag is moved in a direction that narrows the spacing for some reason, or the sensor has responded to something prior to passing the positioning flag. Thus, the process goes to step S44 in which an alarm (1) indicating a positioning flag error is beeped and the process is terminated. If the difference between the tachometer value of the latest positioning flag and the tachometer value of the positioning flag, located one before the latest positioning flag, is not smaller than the spacing between two positioning flags, the process goes to step S46.

In step S46, it is determined if the calculated difference is bigger than the spacing between two positioning flags. If it is, then it is considered that a positioning flag is moved in a direction to widen the spacing for some reason, or the sensor has not responded to a flag but has responded to something other than the flag located behind the flag. Thus, the process goes to step S48 in which an alarm (2) indicating a positioning flag error is beeped and the process is terminated.

If no error is found in step S42 and S46, then, it is determined that there is nothing wrong with the tachometer value for the latest positioning flag and a confirmation flag is turned on in step S50. The process is then terminated.

Errors which are possibly detected by the above-mentioned process are as follows:

A. Positioning flag error (1)
i.e., a positioning flag is detected at a position which is ahead of the right position.
possible causes:
  eg. a shift of a positioning flag in a forward direction, and
  a response of the position sensor to something other than a positioning flag.

B. Positioning flag error (2)
i.e., a positioning flag is detected at a position which is behind the right position.
possible causes:
  eg. a shift of a positioning flag in a backward direction, and
  a response of the position sensor to something other than a positioning flag at a position behind the flag.

C. Position sensor error
i.e., no response of the position sensor when it passes by positioning flags.
possible causes:
  eg. malfunction of the position sensor,
    problems associated with data transmitting route of the position sensor, and
    missing positioning flag(s).

In addition, the confirmation flag is turned off when a positioning flag is detected by the position sensor and the tachometer value for the positioning flag is written in a table.

It is obvious that the present invention is not limited to the above-mentioned embodiments, and variations and modifications may be made without departing from the scope of the present invention.

We claim:

1. A library unit comprising:
    a plurality of frames;
    a plurality of cell shelves, each of said cell shelves comprising a plurality of cells arranged in an X-Y plane, said plurality of cell shelves located in at least one of said plurality of frames;
    at least one accessor having a picker portion;
    a plurality of first reference flags, each of which having substantially the same X axis coordinate, are provided with each of said frames with a spacing in the Y-axis direction;
    a sensor attached to said picker portion so as to detect said plurality of first reference flags; and
    means for calculating a relative inclination angle of said accessor with respect to the Y axis in the X-Y plane from a difference in position in the X axis direction of said plurality of first reference flags in order to obtain a correction value in the X-axis direction for each cell.

2. The library unit as claimed in claim 1,
    wherein a plurality of second reference flags, each of which having substantially the same Z-axis coordinate, are further provided with each of said frames with a spacing in the Y-axis direction, and a relative inclination angle of said accessor with respect to the Y axis in a Y-Z plane is calculated from a difference in position in the Z-axis direction of said plurality of second reference flags in order to obtain a correction value in the Z-axis direction for each cell.

3. The library unit as claimed in claim 2,
    wherein said accessor is positioned at a desired cell based on said correction values in the X-axis and Z-axis directions for said desired cell, which are added to a predetermined set value for the address of said desired cell.

4. The library unit as claimed in claim 3, wherein said accessor moves in the X-axis direction and said picker portion moves in the Y-axis direction and the Z-axis direction.

5. The library unit as claimed in claim 1, wherein at least one of said plurality of cells accommodates a recording medium.

6. The library unit as claimed in claim 5, wherein said recording medium is a cartridge disk.

7. The library unit as claimed in claim 1 further comprising:
    at least one distinguishing code provided with each of said frames,
    a reading means, provided with said accessor, for reading said distinguishing code, and
    a comparing means for comparing frame structures,
    wherein frame structure information of each frame is obtained from said reading means by reading said distinguishing code, and said frame structure information is compared with frame structure information obtained previously in order to check alteration of frame structure.

8. The library unit as claimed in claim 7, wherein said distinguishing code is a bar code, and said reading means is a bar code reader.

9. The library unit as claimed in claim 7, wherein said accessor detects all reference flags in each frame whose structure is determined to be altered when frame structure information of said each frame is compared with corresponding frame structure information previously obtained.

10. The library unit as claimed in claim 9, wherein said accessor detects a couple of reference flags in each frame whose structure is determined to be unaltered when frame structure information of each frame is compared with corresponding frame structure information previously obtained.

11. The library unit as claimed in claim 10, wherein reference flag information previously obtained for said each frame, whose structure is determined to be unaltered, is used as it is when information obtained from said couple of reference flags is substantially the same as corresponding said reference flag information previously obtained, and said accessor detects all reference flags again in each frame, whose structure is determined to be not altered, to renew the reference flag information of said each frame when information obtained from said couple of reference flags is not substantially the same as corresponding said reference flag information previously obtained.

12. The library unit as claimed in claim 1 further comprising:

at least one positioning flag provided for each frame, and a position sensor which detects said positioning flag, wherein said position sensor may be used to measure a distance in the X-axis direction between an initial position of said accessor and each of said at least one positioning flag, and the result obtained is compared with a predetermined value for a corresponding positioning flag in order to calculate a difference which is used for controlling a positioning of said accessor to a desired cell.

13. The library unit as claimed in claim 12, wherein a distance in the X-axis direction between each of said plurality of first reference flags and said positioning flag in the vicinity of a corresponding first reference flag is measured, and the result obtained is compared with a predetermined value for the corresponding first reference flag in order to calculate a difference which is used for controlling a positioning of said accessor to a desired cell.

14. The library unit as claimed in claim 12, wherein an error of said position sensor is detected by comparing a running distance of said accessor between positioning flags obtained by a detection of said positioning flags using said position sensor with a predetermined value for said positioning flags.

15. The library unit as claimed in claim 12, wherein a shift of said positioning flag is detected by comparing a running distance of said accessor between positioning flags obtained by a detection of said positioning flags using said position sensor with a predetermined value for said positioning flags.

16. A library unit comprising:

a plurality of frames;

a plurality of cell shelves located in a at least one of said plurality of frames, wherein each of said cell shelves comprising a plurality of cells arranged in an X-Y plane;

at least one accessor having a movable picker portion;

a plurality of reference flags on said plurality of frames, wherein each reference flag has the same X-axis coordinate and an equal spacing in the Y-axis coordinate;

a sensor attached to said movable picker portion to detect said plurality of reference flags;

a processor to calculate a relative inclination angle in the Z-axis of the accessor with respect to the Y axis in the X-Y plane from a difference in position in the X axis direction of said plurality of first reference flags in order to obtain a correction value in the Z-axis direction for each cell and adjusting said picker portion to compensate for the calculated inclination angle.

* * * * *